US011546251B2

(12) United States Patent
Mallis et al.

(10) Patent No.: US 11,546,251 B2
(45) Date of Patent: Jan. 3, 2023

(54) SYSTEM AND METHOD FOR SECURING COMMUNICATION BETWEEN DEVICES ON A NETWORK WITH MULTIPLE ACCESS POINTS

(71) Applicant: SECURING SAM Ltd., Tel Aviv (IL)

(72) Inventors: Omri Mallis, Tel Aviv (IL); Eilon Lotem, Tel Aviv (IL); Dima Krasner, Tel Aviv (IL)

(73) Assignee: Securing SAM Ltd., Tel Aviv (IL)

( * ) Notice: Subject to any disclaimer, the term of this patent is extended or adjusted under 35 U.S.C. 154(b) by 0 days.

(21) Appl. No.: 16/952,117

(22) Filed: Nov. 19, 2020

(65) Prior Publication Data

US 2021/0152466 A1 May 20, 2021

Related U.S. Application Data

(60) Provisional application No. 62/937,807, filed on Nov. 20, 2019.

(51) Int. Cl.
*H04L 45/28* (2022.01)
*H04L 45/00* (2022.01)
*H04W 84/18* (2009.01)

(52) U.S. Cl.
CPC .............. *H04L 45/28* (2013.01); *H04L 45/22* (2013.01); *H04W 84/18* (2013.01)

(58) Field of Classification Search
CPC ..... H04L 45/22; H04L 45/28; H04L 63/0218; H04L 63/0227; H04L 63/20; H04W 12/088; H04W 84/18
See application file for complete search history.

(56) References Cited

U.S. PATENT DOCUMENTS

| | | | | |
|---|---|---|---|---|
| 7,738,470 | B2* | 6/2010 | Guo | H04W 84/00 370/406 |
| 7,787,416 | B2* | 8/2010 | Gidwani | H04W 28/18 370/329 |
| 9,622,155 | B2* | 4/2017 | McCann | H04W 48/16 |
| 9,794,967 | B2* | 10/2017 | McCann | H04W 48/16 |
| 10,972,437 | B2* | 4/2021 | Schultz | H04L 63/0263 |
| 2005/0059396 | A1* | 3/2005 | Chuah | H04W 24/02 455/435.1 |
| 2006/0104232 | A1* | 5/2006 | Gidwani | H04W 28/18 370/328 |

(Continued)

OTHER PUBLICATIONS

Search Report for European Application EP20208715.1, dated Apr. 19, 2021.

*Primary Examiner* — Khaled M Kassim
(74) *Attorney, Agent, or Firm* — Greenberg Traurig, LLP

(57) ABSTRACT

Systems and methods for managing communication of a plurality of devices in a computer network having a plurality of access points, including identifying, by a second access point of the computer network, a communication request from at least one device of the plurality of devices; sending, by a first access point of the computer network, at least one communication rule to the second access point, the at least one communication rule including conditions for communication corresponding to the identified communication request; and blocking, by the second access point, communication to the second access point when the received communication request is inadmissible according to the at least one communication rule.

22 Claims, 8 Drawing Sheets

(56) References Cited

U.S. PATENT DOCUMENTS

| | | | |
|---|---|---|---|
| 2011/0162060 A1* | 6/2011 | Vijayakumar | H04L 12/413 726/13 |
| 2012/0243456 A1* | 9/2012 | PalChaudhuri | H04W 76/10 370/312 |
| 2015/0312140 A1* | 10/2015 | Yang | H04L 12/18 370/218 |
| 2017/0094693 A1* | 3/2017 | Law | H04W 40/08 |
| 2017/0188271 A1* | 6/2017 | Van Oost | H04W 36/0072 |
| 2018/0077025 A1* | 3/2018 | Helvey | H04L 67/125 |
| 2018/0279192 A1* | 9/2018 | Raissinia | H04W 36/38 |
| 2020/0336467 A1* | 10/2020 | Subbarayan | H04L 47/20 |

\* cited by examiner

Identifying a communication session between a first device and a second device, wherein the first device is in communication with the first access point and the second device is in communication with a second access point of the computer network

401

Inspecting communication packets from the first device to the second device

402

Inspecting communication packets from the second device to the first device

403

Blocking communication to at least one of the first device and the second device when the inspected communication packets are inadmissible according to at least one communication rule

Identifying a communication session between a first device and a second device, wherein the first device is in communication with a first access point and the second device is in communication with a second access point of the computer mesh network

601

Selecting a route through at least one access point in the computer mesh network for the communication session in accordance with a routing protocol

602

Determining that at least one access point from the selected route is unavailable for communication between the first device and the second device with communication packet inspection

SYSTEM AND METHOD FOR SECURING COMMUNICATION BETWEEN DEVICES ON A NETWORK WITH MULTIPLE ACCESS POINTS

CROSS REFERENCE TO RELATED APPLICATION

This application claims priority to and the benefit of Provisional Application No. 62/937,807, filed Nov. 20, 2019, the entire content of which is incorporate herein by reference in their entireties.

FIELD OF THE INVENTION

The present invention relates to data communication in a computer network. More particularly, the present invention relates to systems and methods for securing communication between devices on a computer network with multiple access points.

BACKGROUND OF THE INVENTION

Communication in many computer networks such as in a household with several computers, is usually carried out via wireless networks (e.g., Wi-Fi, Bluetooth, etc.). Some wireless networks can be deployed with multiple access points, that publish the same network details (e.g., the same network name). A (wireless) access point, may be a networking hardware device that allows other wireless devices to connect wirelessly to a wired network. The access point usually connects to a router (via a wired network) as a standalone device, but it can also be an integral component of the router itself. For example, each access point in the network may publish multiple basic service set identifiers ("BSSIDs") with the same service set identifier ("SSID"). Basic service sets are identified by "BSSIDs", which are typically 48-bit labels that conform to MAC-48 conventions. Logical networks (including extended service sets) are typically identified by "SSIDs", which may serve as "network names" and are typically natural language labels, for instance, a natural language network label, such as "home" or "coffee-shop".

In recent years, it is becoming more common to install multiple access points for home networks in order to increase signal coverage, via products, such as wireless extenders, repeaters, and Wi-Fi mesh access points. A device (e.g., an internet of things ("IOT") device) connected to such a wireless network, which utilizes multiple access points, may choose to be associated with either of the multiple access points, for example based on signal strength. Securing a network utilizing multiple access points via a centralized security software on the main gateway is no longer enough because, for example, when one of the access points is the main gateway, communication between local devices may bypass the main gateway altogether by utilizing other access points in the network.

SUMMARY OF THE INVENTION

There is thus provided, in accordance with at least one embodiment of the invention, a method of managing communication of devices in a computer network with a first wireless access point and a second wireless access point, the method including: identifying, by the second access point of the computer network, a communication request from at least one device, sending, by the first access point, at least one communication rule to the second access point, wherein the at least one communication rule includes conditions for communication corresponding to the identified communication request, and blocking, by the second access point, communication to the second access point when the received communication request is inadmissible according to the at least one communication rule. In some embodiments, the first access point of the computer network may be connected to the internet.

In some embodiments, the identified communication request may be sent (by the second access point) to the first access point, and the at least one communication rule for communication corresponding to the identified communication request may be received by the first access point. In some embodiments, the communication request may be distributed (by the second access point) to at least one other access point in the computer network.

In some embodiments, an agent with a security policy may be installed (by the first access point) on each access point in the computer network, all of the security policies may be updated (by the first access point), and at least one security policy may be enforced (by the second access point). In some embodiments, details for all access points in the computer network may be mapped (by the first access point).

In some embodiments, the conditions of the at least one communication rule may include information for allowed values from a group consisting of: IP addresses, MAC addresses, and protocols. In some embodiments, at least one of the devices in the computer network may be an Internet of Things (IOT) device.

There is thus provided, in accordance with at least one embodiment of the invention, a method of managing communication with devices in a computer network with a plurality of wireless access points, including: identifying, by a first access point of the computer network, a communication session between a first device and a second device, wherein the first device is in communication with the first access point and the second device is in communication with a second access point of the computer network, inspecting, by the first access point, communication packets from the first device to the second device, inspecting, by the second access point, communication packets from the second device to the first device, and blocking, by at least one of the first access point and the second access point, communication to at least one of the first device and the second device when the inspected communication packets are inadmissible according to at least one communication rule. In some embodiments, the at least one communication rule may include conditions for allowed communication.

In some embodiments, the second access point may be notified (by the first access point) of the identified communication session. In some embodiments, the first access point may be notified (by the second access point) that the communication session is malicious. In some embodiments, the conditions for the at least one communication rule may include information for allowed values from a group consisting of: IP addresses, MAC addresses, and protocols. In some embodiments, at least one of the devices in the computer network may be an Internet of Things (IOT) device.

There is thus provided, in accordance with at least one embodiment of the invention, a method of managing communication with devices in a computer mesh network with a plurality of wireless access points (APs), including: identifying, by a first access point of the computer mesh network, a communication session between a first device and a second device, wherein the first device is in communication with the first access point and the second device is in communication with a second access point of the computer mesh network, selecting, by the first access point, a route through at least one access point in the computer mesh network for the communication session in accordance with a routing protocol, determining, by the first access point, that at least one access point from the selected route is unavailable for communication between the first device and the second device with communication packet inspection, identifying, by the first access point, a third access point not in the selected route that is available for the communication, and modifying, by the first access point, the route to pass through the third access point.

In some embodiments, at least one access point from the selected route may be determined as unavailable for communication when the available processing resources of the determined at least one access point are below a predefined threshold. In some embodiments, the modification of the route may be verified (by the first access point) to keep traffic load within the computer mesh network to be below a predetermined threshold. In some embodiments, determining that at least one access point from the selected route is unavailable for communication between the first device and the second device with communication packet inspection may be based on traffic load on the at least one access point from the selected route. In some embodiments, the third access point may be verified (by the first access point) to be in communication with at least one of the first device and the second device. In some embodiments, at least one of the devices in the computer network may be an Internet of Things (IOT) device.

There is thus provided, in accordance with at least one embodiment of the invention, a method of managing communication with devices in a computer mesh network with a plurality of wireless access points (APs), including: identifying, by a first access point of the computer mesh network, a communication session between a first device and at least one other access point in the computer mesh network, selecting, by the first access point, a route through at least one access point in the computer mesh network for the communication session in accordance with a routing protocol, determining, by the first access point, that at least one access point from the selected route is unavailable for communication between the first device and the identified at least one access point, with communication packet inspection, identifying, by the first access point, a second access point not in the selected route that is available for the communication, and modifying, by the first access point, the route to pass through the third access point.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 4 shows a flowchart of a method of managing communication of devices in a computer network with a plurality of wireless access points, according to some embodiments of the invention;

FIGS. 6A-6B show a flowchart of a method of managing communication of devices in a computer mesh network with a plurality of wireless access points, according to some embodiments of the invention.

Figure 1:
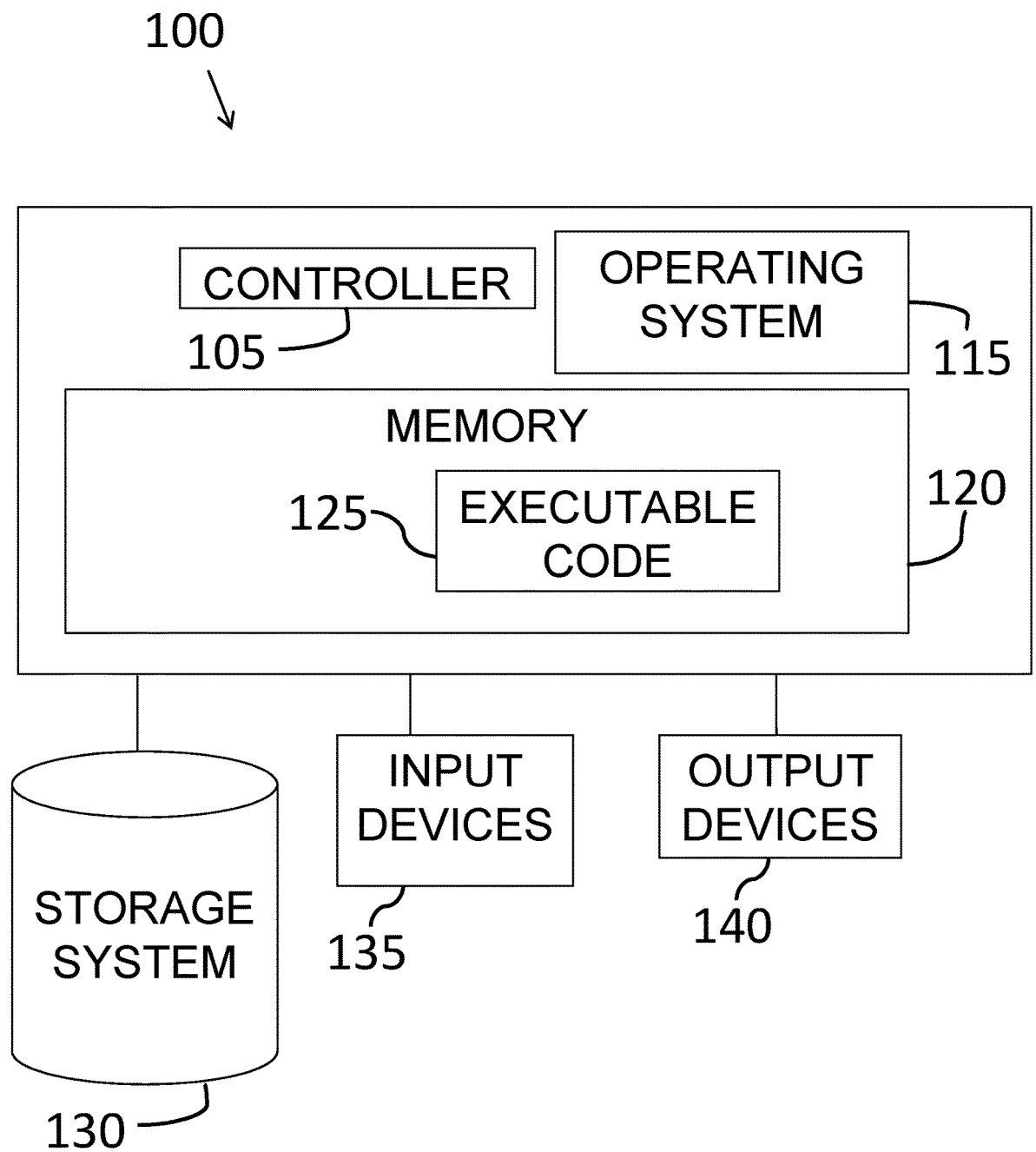
FIG. 1 shows a block diagram of an exemplary computing device, according to some embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EMBODIMENTS OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term set when used herein may include one or more items. Unless explicitly stated, the method embodiments described herein are not constrained to a particular order or sequence. Additionally, some of the described method embodiments or elements thereof can occur or be performed simultaneously, at the same point in time, or concurrently.

Reference is made to FIG. 1, which shows a block diagram of an examplary computing device, according to some embodiments of the invention. A device 100 may include a controller 105, an operating system 115, a memory 120, executable code 125, a storage system 130, input devices 135 and output devices 140. The controller 105 may be, for example, a central processing unit processor (CPU), a chip or any suitable computing or computational device. Controller 105 (or one or more controllers or processors, possibly across multiple units or devices) may be configured to carry out methods described herein, and/or to execute or act as the various modules, units, devices, etc. For example, a storage medium such as memory 120 may store executable code 125 such that controller 105 is configured to carry out embodiments disclosed herein by executing code 125. One or more computing device 100 may be included in, and/or one or more computing device 100 may act as the components of a system according to embodiments of the invention. The computing device 100 or controller 105 of FIG. 1 may act as the various computing devices or controllers of FIGS. 2A-2B, e.g. the devices communicating on a network, such as IOT devices, etc. or a processor receiving a communication request, etc.

Operating system 115 may be or may include any code segment (e.g., one similar to executable code 125 described herein) designed and/or configured to perform tasks involving coordination, scheduling, arbitration, supervising, controlling or otherwise managing operation of computing device 100, for example, scheduling execution of software programs or tasks or enabling software programs or other modules or units to communicate. Operating system 115 may be a commercial operating system. It will be noted that an operating system 115 may be an optional component, e.g., in some embodiments, a system may include a computing device that does not require or include an operating system 115. For example, a computer system may be, or may include, a microcontroller, an application specific circuit ("ASIC"), a field programmable array ("FPGA") and/or system on a chip ("SOC") that may be used without an operating system.

Memory 120 may be or may include, for example, a Random Access Memory ("RAM"), a read only memory ("ROM"), a Dynamic RAM ("DRAM"), a Synchronous DRAM ("SD-RAM"), a double data rate ("DDR") memory chip, a Flash memory, a volatile memory, a non-volatile memory, a cache memory, a buffer, a short term memory unit, a long term memory unit, or other suitable memory units or storage units. Memory 120 may be or may include a plurality of, possibly different memory units. Memory 120 may be a computer or processor non-transitory readable medium, or a computer non-transitory storage medium, e.g., a RAM.

Executable code 125 may be any executable code, e.g., an application, a program, a process, task or script. Executable code 125 may be executed by controller 105 possibly under control of operating system 115. Although, for the sake of clarity, a single item of executable code 125 is shown in FIG. 1, a system according to some embodiments of the invention may include a plurality of executable code segments similar to executable code 125 that may be loaded into memory 120 and cause controller 105 to carry out methods described herein, or act as the "devices" described herein, or perform other functions.

Storage system 130 may be or may include, for example, a flash memory as known in the art, a memory that is internal to, or embedded in, a micro controller or chip as known in the art, a hard disk drive, a CD-Recordable (CD-R) drive, a Blu-ray disk (BD), a universal serial bus (USB) device or other suitable removable and/or fixed storage unit. Content may be stored in storage system 130 and may be loaded from storage system 130 into memory 120 where it may be processed by controller 105. In some embodiments, some of the components shown in FIG. 1 may be omitted. For example, memory 120 may be a non-volatile memory having the storage capacity of storage system 130. Accordingly, although shown as a separate component, storage system 130 may be embedded or included in memory 120.

Input devices 135 may be or may include any suitable input devices, components or systems, e.g., a detachable keyboard or keypad, a mouse and the like. Output devices 140 may include one or more (possibly detachable) displays or monitors, speakers and/or any other suitable output devices. Any applicable input/output (I/O) devices may be connected to computing device 100 as shown by blocks 135 and 140. For example, a wired or wireless network interface card (NIC), a universal serial bus (USB) device or external hard drive may be included in input devices 135 and/or output devices 140. It will be recognized that any suitable number of input devices 135 and output device 140 may be operatively connected to computing device 100 as shown by blocks 135 and 140. For example, input devices 135 and output devices 140 may be used by a technician or engineer in order to connect to a computing device 100, update software and the like. Input and/or output devices or components 135 and 140 may be adapted to interface or communicate.

Embodiments of the invention may include an article such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, cause the processor to carry out methods disclosed herein. For example, a storage medium such as memory 120, may include computer-executable instructions such as executable code 125 and a controller such as controller 105 may execute these instructions or executable code 125.

The storage medium may include, but is not limited to, any type of disk including magneto-optical disks, semiconductor devices such as read-only memories ("ROMs"), random access memories ("RAMs"), such as a dynamic RAM ("DRAM"), erasable programmable read-only memories ("EPROMs"), flash memories, electrically erasable programmable read-only memories ("EEPROMs"), magnetic or optical cards, or any type of media suitable for storing electronic instructions, including programmable storage devices.

Embodiments of the invention may include components such as, but not limited to, a plurality of central processing units ("CPU") or any other suitable multi-purpose or specific processors or controllers (e.g., controllers similar to controller 105), a plurality of input units, a plurality of output units, a plurality of memory units, and a plurality of storage units. A system may additionally include other suitable hardware components and/or software components. In some embodiments, a system may include or may be, for example, a personal computer, a desktop computer, a mobile computer, a laptop computer, a notebook computer, a terminal, a workstation, a server computer, a Personal Digital Assistant ("PDA") device, a tablet computer, a network device, or any other suitable computing device.

In some embodiments, a system may include or may be, for example, a plurality of components that include a respective plurality of central processing units, e.g., a plurality of CPUs as described, a plurality of chips, FPGAs or SOCs, a plurality of computer or network devices, or any other suitable computing device. For example, a system as described herein may include one or more devices such as the computing device 100.

Figure 2A:
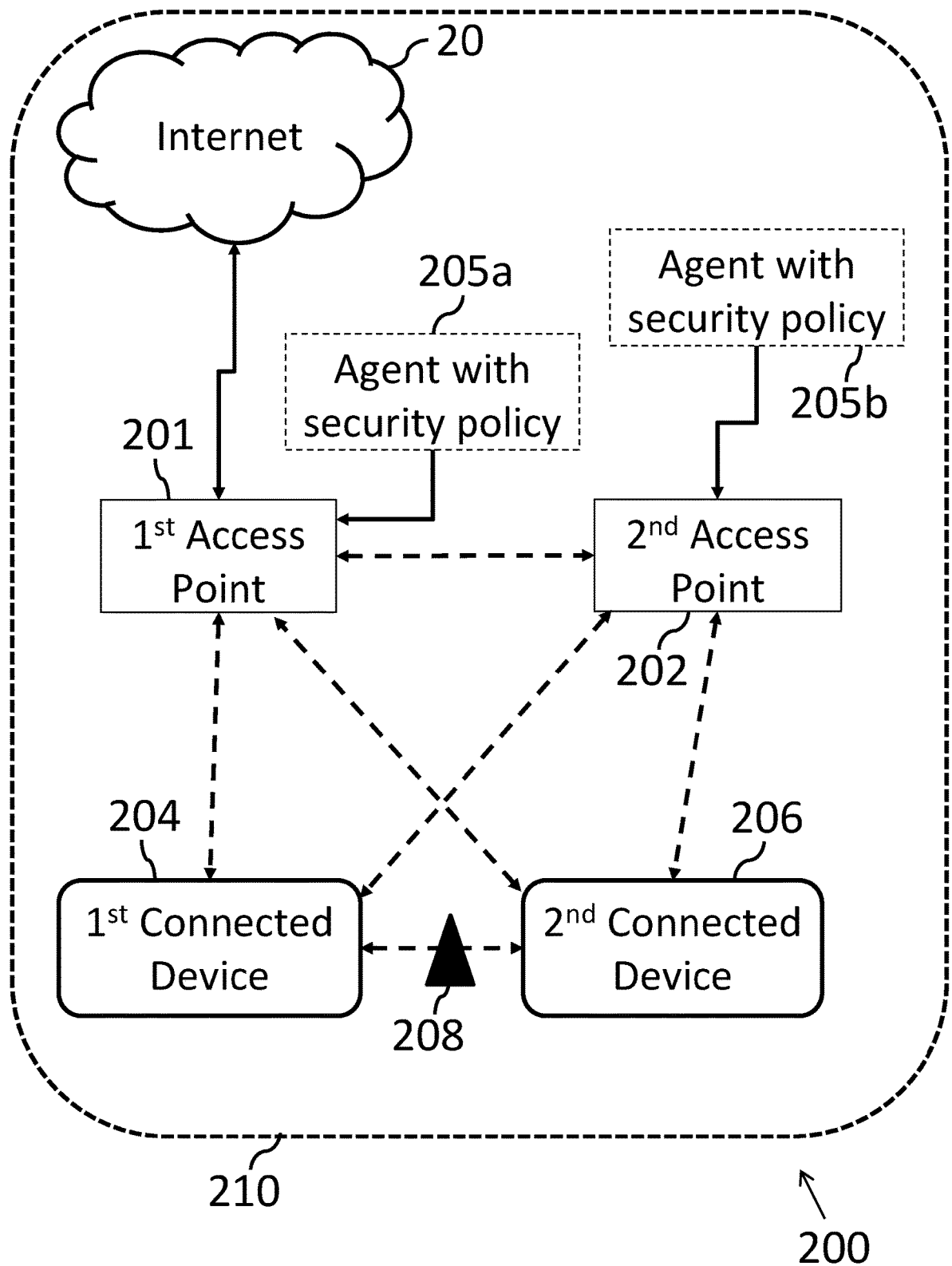
FIG. 2A shows a block diagram of a communication management system for management of communication between devices in a computer network, according to some embodiments of the invention.
Figure 2B:
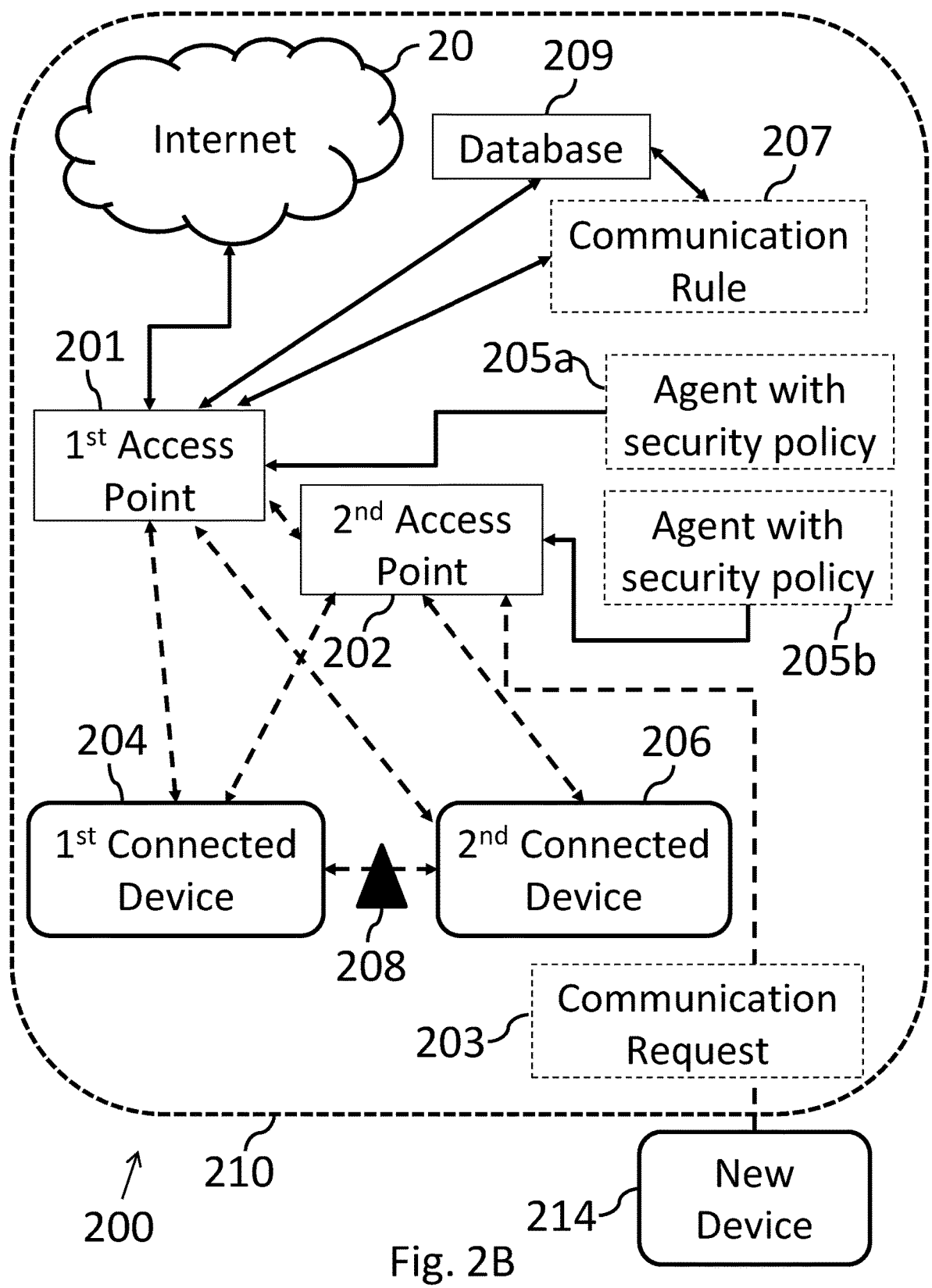
FIG. 2B shows a block diagram of the communication management system with a new device attempting to connect to the computer network, according to some embodiments of the invention

Reference is made to FIGS. 2A-2B which show a block diagram of a communication management system 200 for management of communication between devices in a computer network 210, according to some embodiments of the invention. The direction of arrows in FIGS. 2A-2B may indicate the direction of information flow. In FIGS. 2A-2B, software elements may be indicated by a dashed line, and hardware elements may be indicated by a solid line.

According to some embodiments, the computer network 210 (e.g., a wireless network with computing devices 100, such as shown in FIG. 1) may include a first (wireless) access point 201 and a second (wireless) access point 202 in communication, for instance communicating over Wi-Fi. The first access point 201 of the computer network 210 may be connected to the internet 20, for example connected directly or via a dedicated gateway and/or router device. The first access point 201 may serve as a gateway for the computer network 210 while additional access points may serve as wireless extenders, repeaters and/or mesh access points. In some embodiments of the invention, the second access point 202 may be connected to the internet 20.

The computer network 210 may include at least one connected device 204 and 206 (e.g., the computing device 100 or controller 105 of FIG. 1), for instance an IOT device, that communicates with other devices and/or access points via the wireless computer network 210. For example, the at least one connected device may include smartphones, smartwatches, cameras, electric appliances or any other device that is capable of connecting to the internet 20 and requires communication with the wireless computer network 210. In some embodiments of the invention, at least one connected device 204 and 206 may be, at each point of time, connected to a different access point 201 and 202, and may roam freely between them. For example, a first connected device 204 may be connected to the first access point 201, and a second connected device 206 may be connected to the second access point 202. While only two access points and two connected devices are shown in FIGS. 2A-2B, embodiments of the invention may include more access points, connected devices, security policy agents, and other types of devices in the computer network 210.

In some embodiments of the invention, the first access point 201 may map details for all other access points in the computer network 210. For example, the first access point 201 may broadcast a communication packet throughout the network 210 and accordingly map all access points that respond. In some embodiments of the invention, the first access point 201 may map details for all devices connected to the computer network 210, including both access points 201 and 202 and other connected devices 204 and 206 (e.g., IOT devices).

In some embodiments of the invention, at least one of the access points 201 and 202 of the computer network 210 may enforce a security policy on new devices trying to communicate within the computer network 210. Enforcement of security policies in a computer network with multiple access points may be carried out seamlessly by utilizing a common security policy agent in communication with the access point 201 and 202 or by utilizing multiple security policy agents 205a-b, each utilizing a same security policy and in communication with the access points 201 and 202, such that new devices may move freely between access points with the same security policy applied.

According to some embodiments, a software agent 205a-b with a security policy may be installed on each access point 201 and 202 in the computer network 210 for securing of the connected devices in the network 210, for instance the first connected device 204 and the second connected device 206. The first access point 201 may install the agent 205a-b on each access point 201 and 202 in the computer network 210 and update (e.g., in a predetermined time period) all of the security policies. In some embodiments of the invention, the second access point 202 may enforce at least one security policy on the connected devices 204, 206 and/or on new devices attempting to communicate with the computer network 210.

Reference is made to FIG. 2B which shows a block diagram of the communication management system 200 with a new device 214 attempting to connect to the computer network 210.

According to some embodiments, the second access point 202 may identify a communication request 203 received from a new device 214 that attempts to initiate communication within the computer network 210. For example, the new device 214 may send a communication request 203 to at least one connected device 204, 206 and/or to at least one access point 201, 202 of the computer network 210. The first access point 201 may accordingly send at least one communication rule 207 to the second access point 202 (e.g., corresponding to the communication request 203). The at least one communication rule 207 may be a rule for allowed communication, such as a rule to determine what communication sessions are allowed based on the conditions (e.g., MAC address, IP address, protocol TYPE, type of device, time and/or date, etc.) of the new device 214 attempting to communicate, and may be part of a shared security policy which each agent 205a-b has. Each time one of the agents creates a new communication rule, that agent may share the communication rule with the other agents so that each agent has the same security policy (e.g., communication rules), thus, allowing new devices to move freely between access points while having the same security policy applied.

The at least one communication rule 207 may include conditions for communication corresponding to the identified communication request 203, for instance including conditions for connection ports, communication addresses, etc. In some embodiments of the invention, the communication to the second access point 202 may be blocked when the received communication request 203 is inadmissible according to the at least one communication rule 207. In case that the received communication request 203 is admissible according to the at least one communication rule 207, the communication between the new device 214 and the computer network 210 may be allowed (e.g., enforced by the second access point 202).

According to some embodiments, the second access point 202 may send the identified communication request 203 to the first access point 201. The first access point 201 may accordingly receive the at least one communication rule 207 for communication corresponding to the identified communication request 203. In some embodiments of the invention, the second access point 202 may distribute the identified communication request 203 to at least one other access point in the computer network 201.

The at least one communication rule 207 may be stored at a dedicated database 209 (e.g., stored on a memory 120, such as shown in FIG. 1) and/or stored at the first access point 201. In some embodiments of the invention, the at least one communication rule 207 may be received from external sources, for example downloaded from the internet 20.

In some embodiments of the invention, at least one security policy may be synchronized (e.g., by the first access point 201) between multiple agents 205a-b to be enforced by each access point, in the computer network 210, on the devices 204, 206 connected to that access point. Thus, a security policy may be applied on every device connected to the computer network 210, regardless of the physical connection of the device to the network to ensure that even devices connecting wirelessly may not harm the network. In some embodiments of the invention, the agents 205a-b (installed on each access point in computer network 210) may automatically detect one another via network discovery, for instance to map all connected access points in the computer network 210.

Once a new device 214 attempts to connect to at least one access point 201, 202, the agents 205a-b may coordinate how to best secure the device, for instance a "layer 2" security policy may be synchronized between the agents 205a-b. The security policy may include rules for allowing communications between connected devices in the computer network 210 and prohibiting others. Each access point (e.g., access points 201-202) in computer network 210 may enforce the security policy for devices connected to it, (e.g., drop packets not adhering to the policy for these devices). A security policy, including "layer 3" and/or "layer 4" communication rules may also be applied or synchronized, for instance with conditions for which IP addresses and/or which protocols are allowed.

In some embodiments of the invention, when a new device 214 attempting to join the computer network 210 is blocked by at least one access point 201, 202, the new device 214 may attempt to join the computer network 210 via another access point (not shown). In order to reduce the necessary processing power required each time the new device 214 attempts to communicate with an access point of the computer network 210, the agent 205a-b installed on each access point 201-202 that already identified the new device 214 may synchronize the connection attempt with the other agents (not shown) of other access points (not shown) that have not already identified the new device 214. In some embodiments of the invention, if the new device 214 attempts to communicate with another access point (e.g., the first access point 201), the agent (e.g., the agent 205a) of that access point may inform the other access point (e.g., the second access point 202) about this change, and enforce the security policy by itself. The second access point 202 where the new device 214 previously attempted to connected may not enforce the security policy (e.g., block communication) anymore in order to reduce the load on processing resources. Once the new device 214 disconnects, all of the access points (e.g., access points 201, 202) may be informed and accordingly no longer enforce any security policy for that device 214.

Figure 3:
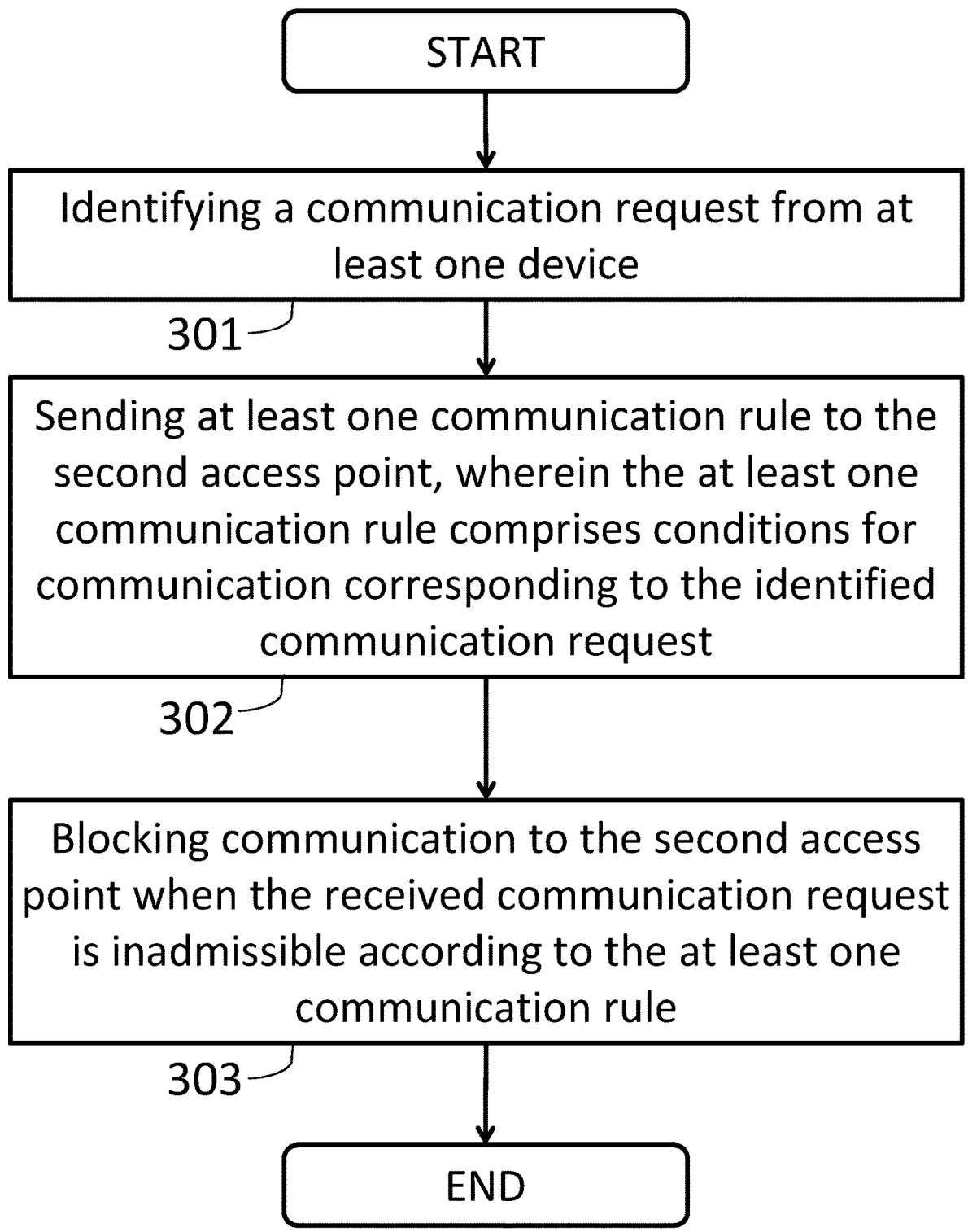
FIG. 3 shows a flowchart of a method of managing communication of devices in a computer network, according to some embodiments of the invention.

Reference is made to FIG. 3 which shows a flowchart of a method of managing communication of connected devices (e.g., connected devices 204, 206 in FIG. 2A-B) (e.g., IOT devices) in a computer network (e.g., computer network 210 in FIG. 2A-B), according to some embodiments of the invention. In Step 301, a communication request (e.g., communication request 203 in FIG. 2B) from at least one new device (e.g., new device 214 in FIG. 2B) attempting to connect to the computer network may be identified, for instance by a second access point (e.g., the second access point 202 in FIG. 2A-B) of the computer network. In Step 302, at least one communication rule (e.g., the communication rule 207 in FIG. 2B) may be sent to the second access point, for instance by a first access point (e.g., the first access point 201 in FIG. 2A-2B). In some embodiments of the invention, the at least one communication rule may include conditions for communication corresponding to the identified communication request.

In Step 303, communication to the second access point may be blocked, for instance by the second access point, when the received communication request is inadmissible according to the at least one communication rule.

Referring back to FIGS. 2A-2B. The load on processing resources of access points for an inspection of a communication packet 208 during communication between devices 204, 206 and/or 214 (e.g., IOT devices), in the computer network 210, may be reduced by distributing the load between the access points 201 and 202. If two connected devices 204, 206 in the computer network 20 communicate with one another, each direction of the traffic may be inspected by a different access point 201, 202, thus splitting the load in two.

In some embodiments of the invention, the agent 205a of the first access point 201 may inspect only the outbound traffic, for instance in the direction from the first connected device 204 to the second connected device 206. In the opposite direction, the agent 205b of the second access point 202 may inspect only the inbound traffic, for instance in the direction from the second connected device 206 to the first connected device 204. Thus, each agent 205a-b may only inspect half of the traffic, splitting the load between the two access points 201, 202. If one of the agents 205a-b detects malicious traffic, for example the first access point 201 may drop the traffic from that (IOT) device and inform the second access point 202 that the session is malicious. After that, both access points 201, 202 may block the communication session.

Reference is made to FIG. 4 which shows a flowchart of a method of managing communication of devices 204, 206 (e.g., IOT devices) in a computer network 210 with a plurality of wireless access points, according to some embodiments of the invention.

In Step 401, a communication session between a first device (e.g., the first connected device 204 in FIGS. 2A-2B) and a second device (e.g., the second connected device 206 in FIGS. 2A-2B) may be identified, for instance by a first access point (e.g., the first access point 201 in FIGS. 2A-2B) of a computer network (e.g., the computer network 210 in FIGS. 2A-2B). In some embodiments of the invention, the first device may be in communication with the first access point, and/or the second device may be in communication with a second access point (e.g., the second access point 202 in FIGS. 2A-2B) of the computer network.

In Step 402, one or more communication packets (e.g., the communication packet 208 in FIG. 2B) from the first device to the second device may be inspected, for instance by the first access point. In Step 403, communication packets from the second device to the first device may be inspected, for instance by the second access point. Accordingly, in Step 404, a communication to at least one of the first device and the second device may be blocked when the inspected communication packets are inadmissible according to at least one communication rule (e.g., the communication rule 207 in FIG. 2B), for instance by at least one of the first access point and the second access point. In some embodiments of the invention, inspection of communication packets may be carried out by agents (e.g., the agents 205a-b in FIGS. 2A-2B) of at least one access point.

In some embodiments of the invention, the at least one communication rule may include conditions for allowed communication. The conditions for the at least one communication rule may include information for allowed values for at least one of IP addresses, MAC addresses, and protocols. In case that the inspected communication packets are admissible according to the at least one communication rule, the communication may be allowed.

According to some embodiments, the first access point 201 may notify the second access point 202 of the identified communication session. In some embodiments of the invention, the first access point 201 may notify the second access point 202 and/or the second access point 202 may notify the first access point 201 that the communication session is malicious.

Figure 5:
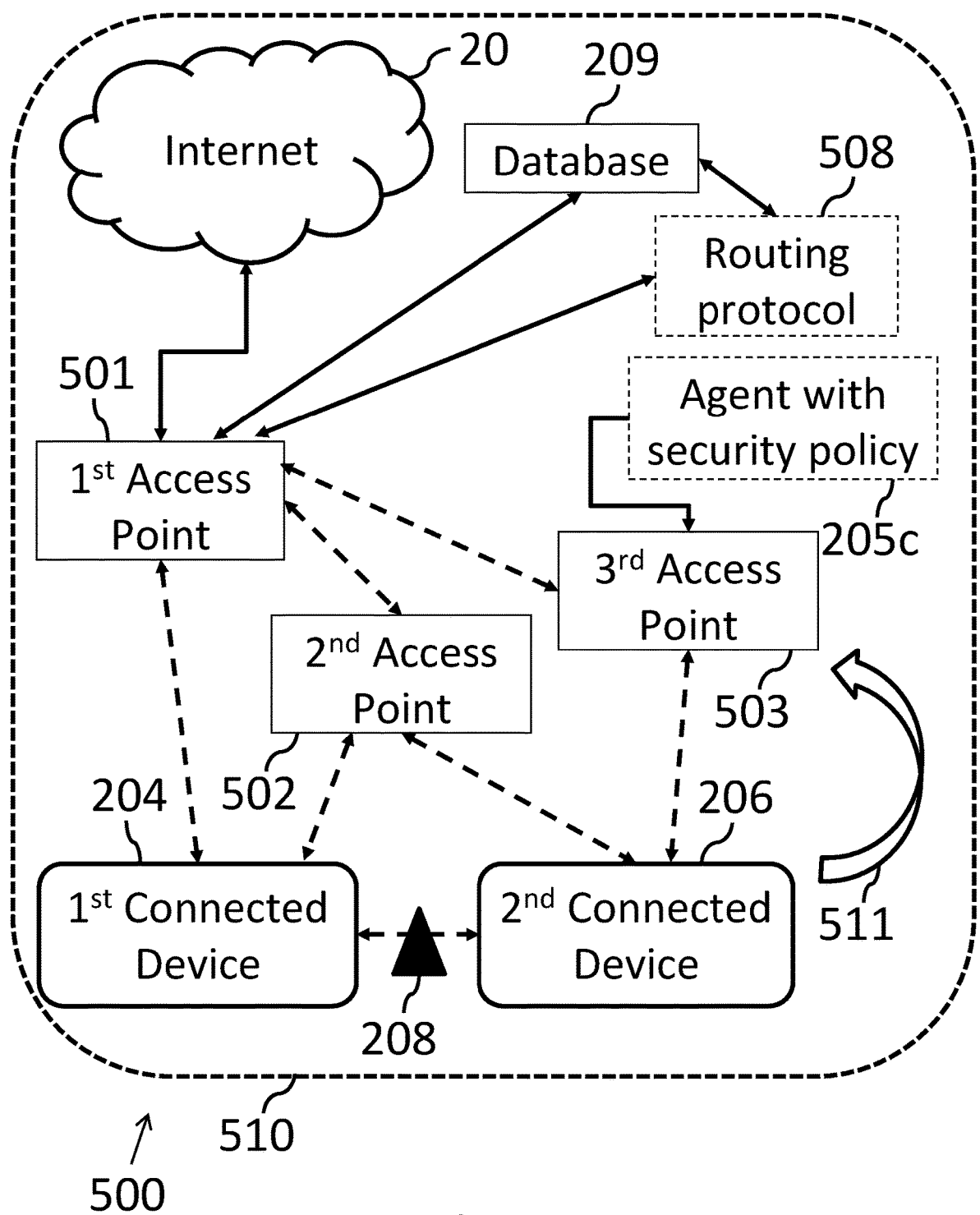
FIG. 5 shows a block diagram of a communication management system for management of communication between devices in a computer mesh network with a plurality of wireless access points, according to some embodiments of the invention.

Reference is made to FIG. 5 which shows a block diagram of a communication management system 500 for management of communication between devices (e.g., connected devices 204 and 206) (e.g., IOT devices) in a computer mesh network 510 with a plurality of wireless access points (e.g., access points 501-503), according to some embodiments of the invention. The computer mesh network 510 may include at least three access points, a first access point 501, a second access point 502 and a third access point 503 communicating with the first device 204 and the second device 206. In mesh networks, each device (e.g., devices 204 and 206) may have a different routing associated to it.

In case that a new potentially vulnerable device (not shown) is connected to the computer mesh network 510, and requires heavy inspection of traffic to avoid exploitation, and if the access point in communication is not able to perform the security task, the new device may be routed (when possible) to communicate with another access point with better processing resources thereby reducing the traffic load in the system 500.

For example, if the second access point 502 has heavy load due to many connected devices, it may rout (e.g., by the agent 205a) one of the connected devices (e.g., the first device 204) to a different access point 501, thus saving itself resources. In some embodiments of the invention, rerouting of communication between devices and access points within the computer mesh network 510 may occur when the wireless signal strength for rerouted access point is strong enough to support the device.

In some embodiments of the invention, communication packets from a connected device to an access point may be routed via a set of other access points automatically calculated in advance by the access point that initiated the rerouting. The rerouting may be carried out in accordance with a routing protocol 508 (e.g., HWMP, BATMAN, AODV, etc.). In some embodiments of the invention, the routing protocol 508 may be stored by each access point (e.g., access points 501-503) in the computer mesh network 510 and/or stored at the database 209 and retrievable by the access points when needed.

For example, a first route may pass between the first connected device 204 and the second connected device 206 via the first access point 501 and the second access point 502. When one of the first access point 501 and the second access point 502 on that route cannot perform the security task of communication packet inspection (e.g., carried out by agents 205a-b), for example due to heavy load, the communication may be rerouted (e.g., carried out by the agent 205c) to pass via a more capable access point, e.g., via new route 511 passing the third access point 503. This change of routes may happen given that the delay induced in the traffic is not significant.

Figure 6B:
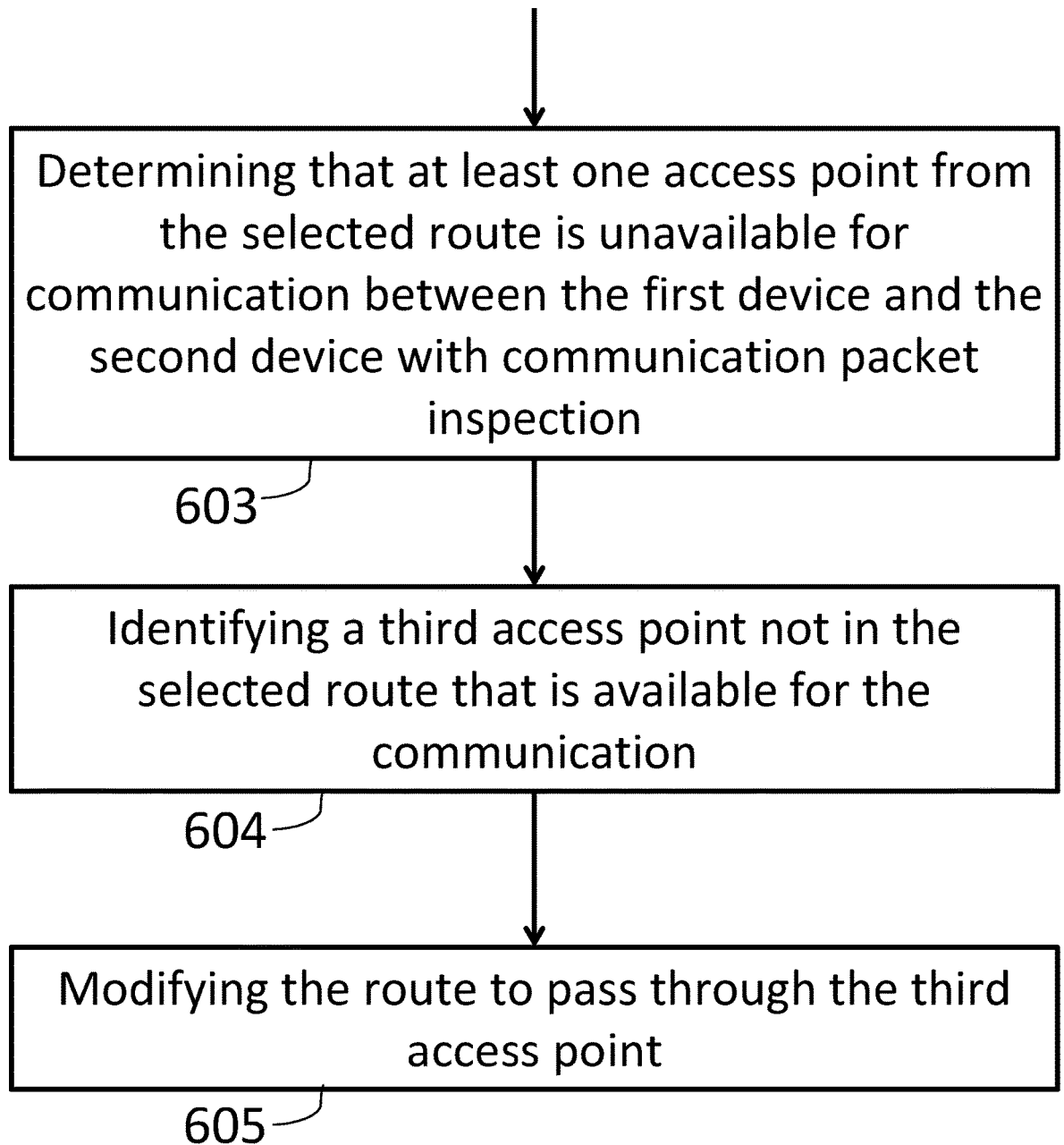

Reference is made to FIGS. 6A-6B which show a flowchart of a method of managing communication of devices (e.g., the connected devices 204, 206 in FIGS. 2A-2B and 5) (e.g., IOT devices) in a computer mesh network with a plurality of wireless access points (e.g., access points 501-503 of FIG. 5), according to some embodiments of the invention. In Step 601, a communication session between a first connected device (e.g., the first device 204 of FIGS. 2A-2B and 5) and a second connected device (e.g., the second device 206 of FIGS. 2A-2B and 5) may be identified, for instance by a first access point (e.g., the first access point 501 in FIG. 5) of a computer mesh network (e.g., the computer mesh network 510 in FIG. 5).

In Step 602, a route (e.g., the route 511 in FIG. 5) through at least one access point (e.g., access points 501, 502, 503 in FIG. 5) in the computer mesh network may be selected, for instance by the first access point, for the communication session in accordance with a routing protocol (e.g., the routing protocol 508 in FIG. 5). In Step 603, at least one access point from the selected route may be determined as unavailable for communication between the first device and the second device, for instance by the first access point 501, with communication packet (e.g., the communication packet 208 of FIGS. 2B and 5) inspection.

In Step 604, a third access point (e.g., the third access point 503 of FIG. 5) not in the selected route that is available for the communication may be identified. In Step 605, the route may be modified to pass through the third access point, for instance by the first access point.

In some embodiments of the invention, at least one access point from the selected route may be determined as unavailable for communication when the available processing resources of the determined at least one access point are below a predefined threshold. In some embodiments of the invention, the modification of the route may be verified to keep traffic load within the computer mesh network to be below a predetermined threshold, for example if a delay induced in the network traffic (due to the modification of the route) is below a predetermined threshold.

In some embodiments of the invention, the third access point may be verified (e.g., by the first access point) to be in communication with at least one of the first device and the second device. In some embodiments of the invention, determination that at least one access point from the selected route is unavailable for communication between the first device and the second device with communication packet inspection may be based on traffic load on the at least one access point from the selected route.

Unless explicitly stated, the method embodiments described herein are not constrained to a particular order in time or chronological sequence. Additionally, some of the described method elements may be skipped, or they may be repeated, during a sequence of operations of a method.

Various embodiments have been presented. Each of these embodiments may of course include features from other embodiments presented, and embodiments not specifically described may include various features described herein.

The invention claimed is:

1. A method, comprising:
installing, in a plurality of access points communicating over a computing network, a plurality of security policy software agents to be executed by the plurality of access points;
wherein the plurality of security policy software agents is configured to utilize a plurality of device-specific access communication rules to manage a plurality of registered devices that communicate over the computing network;
wherein the plurality of device-specific access communication rules is configured to determine when to allow or reject at least one new device to be connected to communicate in the computing network;

receiving, by a first security policy software agent of a first access point from the plurality of access points, a communication request from the at least one new device requesting to communicate in the computing network;

defining, by the first security policy software agent, based at least in part on the communication request and the plurality of device-specific access communication rules, at least one new device-specific access communication rule that determines when to:
(i) register the at least one new device in the plurality of registered devices to communicate in the computing network, or
(ii) reject the at least one new device to communicate in the computing network; and automatically sending, by the first security policy software agent, the at least one new device-specific access communication rule to each other security policy software agent in each other access point in the computing network to update each other security policy software agent with the at least one new device-specific access communication rule;

wherein the plurality of device-specific access communication rules comprises at least one condition to maintain a communication session in the computing network between a first registered device and a second registered device of the plurality of registered devices;

wherein the first registered device is in communication with the first access point and the second registered device is in communication with a second access point from the plurality of access points;

inspecting, by the first security policy software agent, communication packets from the first registered device to the second registered device;

inspecting, by a second security policy software agent of the second access point, communication packets from the second registered device to the first registered device;

maintaining, by the first security policy software agent and the second security policy software agent, the communication session when the inspected communication packets adhere to the at least one condition; and terminating, by the first security policy software agent and the second security policy software agent, the communication session when the inspected communication packets violate the at least one condition.

2. The method of claim 1, wherein the plurality of device-specific access communication rules comprises an IP address, a MAC address, a protocol type, a type of device, a time, a date, or any combination thereof.

3. The method of claim 1, wherein at least one of the plurality of registered devices is an Internet of Things (IoT) device.

4. The method of claim 1, wherein the computing network is a computer mesh network.

5. The method of claim 4, wherein each security policy software agent of each access point comprises at least one routing protocol; and further comprising:

selecting, by the first security policy software agent, a data traffic route through at least one access point of the plurality of access points for the communication session in accordance with the at least one routing protocol, determining, by the first security policy software agent, that at least one access point from the selected data traffic route is unavailable for communication between the first registered device and the second registered device with communication packet inspection;

identifying, by the first security policy software agent, a third access point from the plurality of access points not in the selected data traffic route that is available for the communication, and modifying, by the first security policy software agent, the data traffic route to pass through the third access point.

6. The method of claim 5, further comprising verifying, by the first security policy software agent, that the modified data traffic route keeps a data traffic load within the computer mesh network below a predetermined threshold.

7. The method of claim 5, wherein the determining that the at least one access point from the selected data traffic route is unavailable for the communication when available processing resources of the at least one access point from the selected data traffic route are below a predefined threshold.

8. The method of claim 5, wherein the determining that the at least one access point from the selected data traffic route is unavailable for communication is based on a data traffic load through the at least one access point from the selected data traffic route.

9. The method according to claim 1, further comprising enforcing, by each updated security policy software agent, the at least one new device-specific access communication rule.

10. The method according to claim 1, wherein the defining of the at least one new device-specific access communication rule comprises generating the at least one new device-specific access communication rule by the first security policy software agent.

11. The method according to claim 1, wherein the defining of the at least one new device-specific access communication rule comprises receiving the at least one new device-specific access communication rule from the internet by the first security policy software agent.

12. A system comprising:
a plurality of access points configured to communicate over a computing network;
a plurality of security policy software agents configured to utilize a plurality of device-specific access communication rules to manage a plurality of registered devices that communicate over the computing network;
wherein the plurality of security policy software agents is installed in the plurality of access points and to be executed by the plurality of access points;
wherein plurality of device-specific access communication rules is configured to determine when to allow or reject at least one new device to be connected to communicate in the computing network;
wherein a first security policy software agent from the plurality of security policy software agents of a first access point of the plurality of access points is configured to:
receive a communication request from at least one new device requesting to communicate in the computing network;
define based at least in part on the communication request and the plurality of device-specific access communication rules, at least one new device-specific access communication rule that determines when to:
(i) register the at least one new device in the plurality of registered devices to communicate in the computing network, or (ii) reject the at least one new device to communicate in the computing network; and automatically send the at least one new device-specific access communication rule to each other security policy software agent in each other access point in the computing network to update each security policy software agent with the at least one new device-specific access communication rule;

wherein a first registered device of the plurality of registered devices is in communication with the first access point and a second registered device of the plurality of registered devices is in communication with a second access point from the plurality of access points;

wherein the plurality of device-specific access communication rules comprises conditions to maintain a communication session in the computing network between the first registered device and the second registered device;

wherein the first security policy software agent is further configured to inspect communication packets from the first registered device to the second registered device;

wherein the second security policy software agent of the second access point is further configured to inspect communication packets from the second registered device to the first registered device;

wherein the first security policy software agent and the second security policy software agent are configured to maintain the communication session when the inspected communication packets adhere to the conditions; and wherein the first security policy software agent and the second security policy software agent are configured to terminate the communication session when the inspected communication packets violate the conditions.

13. The system of claim 12, wherein the plurality of device-specific access communication rules comprises an IP address, a MAC address, a protocol type, a type of device, a time, a date, or any combination thereof.

14. The system of claim 12, wherein at least one of the plurality of registered devices is an Internet of Things (IoT) device.

15. The system of claim 12, wherein the computing network is a computer mesh network.

16. The system of claim 15, wherein each security policy software agent of each access point comprises at least one routing protocol; and wherein the first security policy software agent is further configured to:

select a data traffic route through at least one access point of the plurality of access points for the communication session in accordance with the at least one routing protocol, determine that at least one access point from the selected data traffic route is unavailable for communication between the first registered device and the second registered device with communication packet inspection, identify a third access point from the plurality of access points not in the selected data traffic route that is available for the communication, and modify the data traffic route to pass through the third access point.

17. The system of claim 16, where in the first security policy software agent is further configured to verify that the modified data traffic route keeps a data traffic load within the computer mesh network below a predetermined threshold.

18. The system of claim 16, wherein the first security policy software agent is further configured to determine that the at least one access point from the selected data traffic route is unavailable for the communication when available processing resources of the at least one access point from the selected data traffic route are below a predefined threshold.

19. The system of claim 16, wherein the first security policy software agent is configured to determine that the at least one access point from the selected data traffic route is unavailable for communication based on a data traffic load through the at least one access point from the selected data traffic route.

20. The system according to claim 12, wherein each updated security policy software agent is configured to enforce the at least one new device-specific access communication rule.

21. The system according to claim 12, wherein the first security policy software agent is configured to define the at least one new device-specific access communication rule by generating the at least one new device-specific access communication rule.

22. The system according to claim 12, wherein the first security policy software agent is configured to define the at least one new device-specific access communication rule by receiving the at least one new device-specific access communication rule from the internet.

* * * * *